US009935877B2

(12) United States Patent
Bournelle et al.

(10) Patent No.: US 9,935,877 B2
(45) Date of Patent: Apr. 3, 2018

(54) METHOD FOR TRANSMITTING ROUTING INFORMATION

(71) Applicant: Orange, Paris (FR)

(72) Inventors: Julien Bournelle, Paris (FR); Lionel Morand, Malakoff (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/442,325

(22) PCT Filed: Nov. 12, 2013

(86) PCT No.: PCT/FR2013/052716
§ 371 (c)(1),
(2) Date: May 12, 2015

(87) PCT Pub. No.: WO2014/072668
PCT Pub. Date: May 15, 2014

(65) Prior Publication Data
US 2016/0119231 A1    Apr. 28, 2016

(30) Foreign Application Priority Data

Nov. 12, 2012 (FR) ..................... 12 60726

(51) Int. Cl.
*H04L 12/28* (2006.01)
*H04L 12/741* (2013.01)
(Continued)

(52) U.S. Cl.
CPC .............. *H04L 45/74* (2013.01); *H04L 45/00* (2013.01); *H04L 61/1511* (2013.01); *H04L 61/2007* (2013.01); *H04L 63/0892* (2013.01)

(58) Field of Classification Search
None
See application file for complete search history.

(56) References Cited

U.S. PATENT DOCUMENTS

| 8,799,422 B1* | 8/2014 | Qu ........................... G06F 8/67 709/220 |
| 2011/0060830 A1* | 3/2011 | Kang ................. H04L 63/0892 709/224 |

(Continued)

FOREIGN PATENT DOCUMENTS

CN    101984605 A    3/2011

OTHER PUBLICATIONS

Database WPI, Week 201129. Thomson Scientific, London, GB; AN 2011-E28061, XP002705037.
(Continued)

*Primary Examiner* — Otis L Thompson, Jr.
(74) *Attorney, Agent, or Firm* — David D. Brush; Westman, Champlin & Koehler, P.A.

(57) ABSTRACT

A method for transmitting routing information between first and second nodes of a plurality of nodes capable of exchanging data relative to the management of subscribers to electronic communication services. The first node and the second node are connected and have exchanged the respective management capabilities thereof. The method includes, when the management capabilities supported by both the first node and the second node include a discovery capability: triggered by a predefined event, transmission, by the first node to the second node, of a discovery message including at least one item of routing information included in a routing table of the first node and relative to at least a third node.

12 Claims, 2 Drawing Sheets

Figure 1:
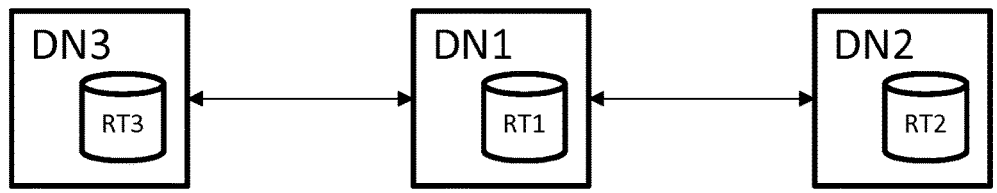

(51) Int. Cl.
*H04L 12/701* (2013.01)
*H04L 29/06* (2006.01)
*H04L 29/12* (2006.01)

(56) References Cited

U.S. PATENT DOCUMENTS

| | | | | |
|---|---|---|---|---|
| 2011/0202676 A1* | 8/2011 | Craig | ............... | H04L 63/20 709/238 |
| 2011/0314178 A1* | 12/2011 | Kanode | ............... | H04L 63/0892 709/238 |
| 2012/0269198 A1* | 10/2012 | Patel | ............... | H04L 45/021 370/400 |
| 2014/0075048 A1* | 3/2014 | Yuksel | ............... | H04L 45/02 709/242 |

OTHER PUBLICATIONS

International Search Report and Written Opinion dated Feb. 19, 2014 for corresponding International Application No. PCT/FR2013/052716, filed Nov. 12, 2013.
Calhoun Airespace P. et al.: "Diameter Base Protocol; rfc3588.txt", Sep. 1, 2003 (Sep. 1, 2009), XP015009370, ISSN: 0000-0003 p. 59, line 5-p. 61, line 23.
English translation of the Written Opinion dated May 12, 2015 for corresponding International Application No. PCT/FR2013/052716, filed Nov. 12, 2013.
French Search Report and Written Opinion dated Jul. 29, 2013 for corresponding French Application No. FR1260726, filed Nov. 12, 2012.

\* cited by examiner

METHOD FOR TRANSMITTING ROUTING INFORMATION

CROSS-REFERENCE TO RELATED APPLICATIONS

This Application is a Section 371 National Stage Application of International Application No. PCT/FR2013/052716, filed Nov. 12, 2013, which is incorporated by reference in its entirety and published as WO 2014/072668 A1 on May 15, 2014, not in English.

1. FIELD OF THE INVENTION

The invention application lies in the field of the authentication, authorization and accounting (AAA) for users of communication networks, by the operators of these networks, and more particularly in the field of the routing of the AAA requests between operators. More specifically, the invention application relates to the AAA protocol known by the name of Diameter.

2. PRIOR ART

When a network node conforming to the Diameter protocol (RFC 3588, IETF Standard) receives a request, it uses a field of the request indicating the destination domain to determine if, and to whom, it must transmit it. A domain corresponds to just one and the same operator.

When the destination domain is not its own, the node must transmit the request and consults its routing table to determine whether it knows a server serving this destination domain. If such is the case, it transmits the request to this server.

If it does not know a server serving the destination domain, the transmitting node then transmits a DNS (Domain Name System) request to find a node of the domain concerned. Since the DNS response gives the IP (Internet Protocol) address of the requested node, the transmitting node is obliged to use the IP routing plan to reach the next node.

It would be understood that, according to the prior art, a route between two nodes is set up step by step, without it being possible to establish any complete and precise path between the two in advance.

The IP routing plan does not make it possible for the transmitting node and therefore the operator of this node to control the domain(s) through which the request will pass.

With the proliferation of operators around the world and therefore the number of different domains, the use of DNS requests is proving to be a drawback since it does not allow for any control over the route taken by the messages between nodes. The different domains of the IP space do not in fact offer the same guarantees of security throughout, which poses serious problems to the operators whose services rely on the reliability and the integrity of the signaling exchanged between Diameter nodes.

One of the aims of the invention is to remedy the drawbacks of the prior art.

3. EXPLANATION OF THE INVENTION

The invention improves the situation using a method for transmitting routing information between a first and a second node of a plurality of nodes capable of exchanging data relating to the management of subscribers to electronic communication services, the first node and the second node being connected and having exchanged their respective management capabilities, the method comprising, when the management capabilities supported by both the first node and the second node comprise a routing information discovery capability:

triggered by a predetermined event, a step of transmission by the first node, to the second node, of a routing information discovery message comprising at least one routing information item included in a routing table of the first node and relating to at least one third node.

In an AAA protocol like Diameter for example, when a first node connects to a second node using the address of the second node, the two nodes exchange certain information relating to their respective management capabilities, that is to say, for example, what authentication, authorization and accounting applications they support. This enables them to know if they share a discovery capability, that is to say if, out of the types of messages of the protocol concerned for which exchange is possible between them, there is a type of message relating to their respective routing table. Thus, by virtue of the invention, the first node has the second node discover information included in its routing table. This information can for example relate to one or more other nodes already connected to the first node.

A protocol such as Diameter according to the prior art relies on routing by domain name, precisely in order to be able to use DNS requests to discover a Diameter node address when it is not present in a routing table. The Diameter protocol according to the prior art does not therefore provide any mechanism other than the DNS request to enable a Diameter node to update its routing table with new addresses. The only routing information of a routing table which is not the product of DNS requests is that information entered on initialization, generally concerning immediately neighboring nodes.

Running counter to the bias of the prior art, the method according to the invention enables a routing table to be propagated from one node to another when they are connected, thus limiting the subsequent use of DNS requests.

According to one aspect of the invention, the trigger event is the connection of the first node with the second node, the routing information discovery message is a discovery request message, and the transmission step is furthermore followed by the following steps:

a step of reception by the first node, from the second node, of a discovery response message comprising at least one routing information item included in a routing table of the second node, a step of enrichment of the routing table of the first node by the storage of the at least one routing information item received.

By virtue of the step of reception of a response message, in which the second node in turn has the first node discover information relating to nodes which are connected to it, for example a fourth node, the first node can store the information in its routing table in the enrichment step. The routing tables of the first and second nodes can thus be identical.

This makes it possible, for example, if the first node must, at a subsequent time, address the fourth node, it will have the same capabilities as the second node to do so, without using a DNS request, which is the only possibility according to the prior art. Furthermore, it will be able to reach this fourth node by using a route passing through the second node, which presents the advantage of taking only trusted links.

According to one aspect of the invention, the routing information discovery message is a discovery response message, the trigger event is the reception of a discovery request message from the second node comprising at least one routing information item included in a routing table of the second node, and the method further comprises:

a step of enrichment of the routing table of the first node by the storage of the at least one routing information item received.

By virtue of this aspect, the same advantages are obtained when the second node has the initiative for exchanging routing information as when it is the first node.

According to one aspect of the invention, the trigger event is the enrichment of the routing table of the first node by at least one routing information item received from a fifth node.

By virtue of this aspect, the first node has the second node discover information included in its routing table not when it connects with it, but for example when it connects with a fifth node. Thus, the routing table of the second node is updated when a modification is made to that of the first node, the modification being able to be caused by its connection with a fifth node.

This enables the second node to have the same information as the first node to subsequently address this fifth node or any other node, even if the first node was not connected to the fifth node at the time when the first and second nodes were connected. For example, it will be able to reach this fifth node by using a route passing through the first node, which offers the advantage of taking only trusted links.

According to one aspect of the invention, the routing information item relating to a node comprises:

an identifier of the node,
an identifier of the domain of the node.

By virtue of this aspect, a routing table is able to construct routes between nodes as a function of the domains of the nodes, thus making it possible for an operator to precisely control the routing of its requests to another operator.

For example, the first node can thus route a Diameter request to the fourth node by passing through the second node. In this way, the operator of the first domain is assured that its requests to the fourth domain take a link between the first and the second domain which it trusts because it trusts the second operator, and a link between the second and the fourth domains, which it can a priori trust because the second operator trusts the fourth operator.

According to one aspect of the invention, the routing information item relating to a node further comprises:

a list of management capabilities supported by the node,
a node type, for each management capability supported.

By virtue of this aspect, a routing table is able to construct routes between nodes not only as a function of the domains of the nodes but also as a function of the applications supported per node, thus enabling an operator to more accurately control the routing of its requests to another operator.

For example, the first node may want to check that the nodes located between the first and the fourth support both specific authentication functions, using an authentication application, and specific accounting functions, using an accounting application, in order for its requests for the authentication and accounting applications to take the same route.

A node of "relay" type transfers a request without modifying it and remains in the signaling route, notably for the response. A node of "redirect" type immediately returns a response to the sender by indicating the next node to which the request should be sent again, and does not therefore remain in the signaling route. A node of "proxy" type can modify the content of a request. For example, if it has the possibility thereof, the first node may prefer a route passing only through "relay" nodes, and avoiding nodes of "proxy" or "redirect" type.

According to one aspect of the invention, the routing information item relating to a node further comprises:

an information item relating to the function supported by the node for each management capability supported.

By virtue of this aspect, a routing table is able to construct routes between nodes not only as a function of the domains of the nodes, as a function of the applications supported per node, or as a function of the Diameter node types, but also as a function of the type of equipment item implementing the Diameter node. This equipment item may be a network equipment item such as an SIP (Session Initiation Protocol) server, and use the Diameter protocol to transport information relating to another protocol, such as, for example, SIP.

Thus, this information item relating to the function supported by the node is an additional information item that can be used by the routing table to construct routes between SIP servers, for example.

According to one aspect of the invention, the routing information discovery message comprises a field in XML format comprising the at least one routing information item.

By virtue of this aspect, the Diameter protocol has no need to provide precisely either the size or the number of fields in the routing information discovery messages, which are highly variable as a function of the number of nodes entered in a routing table.

According to one aspect of the invention, said at least one routing information item included in the routing information discovery message relates to at least one third node to which the first node is connected.

By virtue of this aspect, the first node transmits, to a second node to which it has been previously connected, information relating to another node, only if this other node is directly connected to the first node. It does not therefore transmit information relating to nodes possibly connected to this other node, but not connected to the first node, even if this information is included in the routing table of the first node. This makes it possible to limit the volume of the routing information discovery messages, and the size of the routing tables.

The various aspects of the method which have just been described can be implemented independently of one another or in combination with one another.

The invention relates also to a device for transmitting routing information between a first and a second node of a plurality of nodes capable of exchanging data relating to the management of subscribers to electronic communication services, the first node and the second node being connected and having exchanged their respective management capabilities, the device comprising a module for transmission, by the first node, to the second node, of a discovery message comprising at least one routing information item included in a routing table of the first node and relating to at least one third node.

This device implements the method for transmitting routing information which has just been described.

Such a device can be implemented in an equipment item dedicated to the routing of Diameter signaling, such as the "Diameter Edge Agent" defined by the 3GPP (3rd Generation Partnership Project) Standard, or any dedicated Diameter agent, such as the "Diameter Routing Function". The device can also be implemented in network nodes of "Home Subscriber Server" (HSS) type, or of "Policy Control and Charging Rules Function" (PCRF) type, or in an AAA server.

The invention relates also to a management equipment item of a telecommunication network, capable of receiving request messages and of transmitting response messages relating to the authentication, the authorization and the accounting of subscribers to electronic communication services, comprising a device such as that which has just been described.

Such a management equipment item can for example be a "Diameter Edge Agent" or any dedicated Diameter agent, such as the "Diameter Routing Function", a network node of "Home Subscriber Server" type, or of "Policy Control and Charging Rules Function" type, or an AAA server.

The invention relates also to a signal bearing a discovery request message intended for a management equipment item capable of receiving a request message relating to the management of subscribers to electronic communication services, the message comprising at least one routing information item included in the routing table of another management equipment item capable of transmitting a request message relating to the management of subscribers to electronic communication services, and in that it is transmitted by this other equipment item.

According to one aspect of the invention, the signal bearing a discovery request message further comprises an indication concerning the type of the discovery request message.

By virtue of this aspect, the management equipment item capable of receiving the request message is capable of distinguishing between a number of types of discovery request messages. For example, if the message is of "creation" type, that is to say if the sending of the request message is triggered by the connection of the transmitting node with the receiving node, a discovery response message will have to be sent in return. If the message is of "update" type, that is to say if the sending of the request message is triggered by the connection of the transmitting node with a node other than the receiving node, no discovery response message will be sent.

This notably makes it possible to avoid transmitting pointless discovery response messages.

The invention relates also to a signal bearing a discovery response message intended for a management equipment item capable of receiving a response message relating to the management of subscribers to electronic communication services, the message comprising at least one routing information item included in the routing table of another management equipment item capable of transmitting a response message relating to the management of subscribers to electronic communication services, and in that it is transmitted by this other equipment item in response to a discovery request message.

The invention relates also to a computer program comprising instructions for the implementation of the steps of the method for transmitting routing information which has just been described, when this method is executed by a processor.

The invention relates finally to a storage medium that can be read by a management equipment item on which the program which has just been described is stored, that can use any programming language, and be in the form of source code, object code, or intermediate code between source code and object code, such as in a partially compiled form, or in any other desirable form.

4. DESCRIPTION OF THE FIGURES

Figure 2:
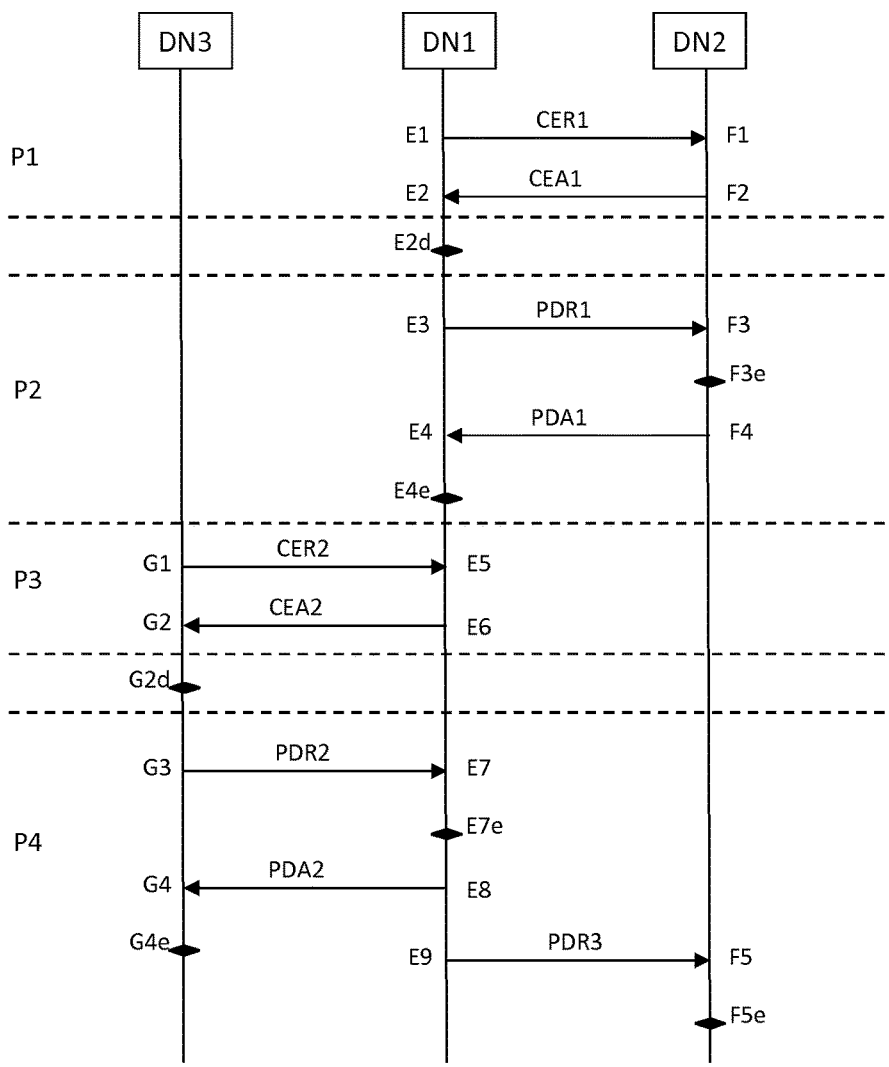
Figure 3:
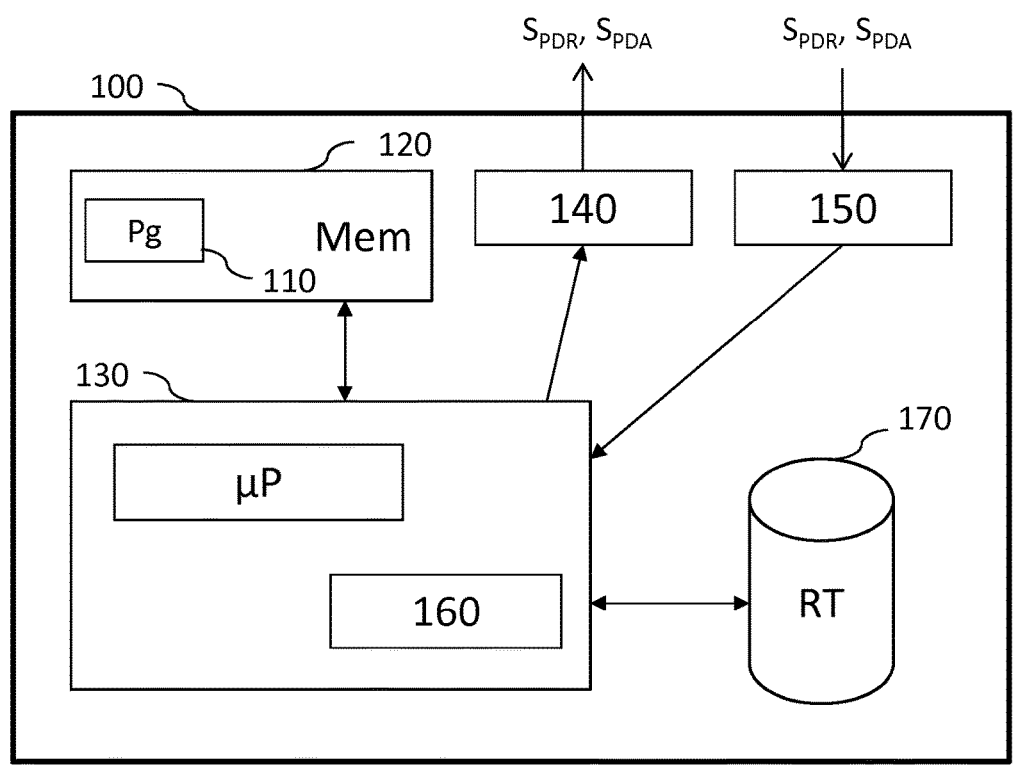

Other advantages and features of the invention will become more clearly apparent on reading the following description of a particular embodiment of the invention, given as a simple illustrative and nonlimiting example, and the attached drawings, in which:

FIG. 1 schematically shows a first, a second and a third management equipment item implementing the method for transmitting routing information according to the invention, FIG. 2 shows an exemplary implementation of the method for transmitting routing information, according to a first and a second embodiment of the invention, FIG. 3 shows an exemplary structure of a device for transmitting routing information, according to one aspect of the invention.

5. DETAILED DESCRIPTION OF AT LEAST ONE EMBODIMENT OF THE INVENTION

Hereinafter in the description, examples of a number of embodiments of the invention are presented, based on the Diameter protocol, but the invention applies also to other protocols, such as the RADIUS protocol, or any protocol, whether AAA or not, used in any signaling system for an electronic communication network, such as, for example, SIP.

FIG. 1 schematically shows a first, a second and a third management equipment item implementing the method for transmitting routing information according to the invention.

The management equipment items DN1, DN2 and DN3 are, for example, network nodes conforming to the Diameter protocol, respectively comprising a routing table RT1, RT2, RT3. The routing table RT1 of the node DN1, according to the invention, comprises, for example, the following information, for each of the domains known to the node DN1, including the domain of the node DN1:

| | |
|---|---|
| "Realm Name" | Domain name; Field used as main search key in the routing table |
| "Application Identifier" | Identifier of the application supported by the domain; field used as secondary search key in the routing table |
| "Local Action" | Local action; indicates the type of Diameter node (local, relay, proxy or redirect) |
| "Server Identifier" | Server identifier; indicates the server or servers (Diameter node) of the domain to which a message is routed |
| "Static or Dynamic" | Static or dynamic; indicates how the route or routes have been configured |
| "Expiration Time" | Expiration; indicates the date/time after which the route or routes configured dynamically cease to be valid |
| "Routing Paths" | Possible route(s) to the domain |

According to the invention, a first node DN1 and a second node DN2 exchange information included in their respective routing tables RT1 and RT2, when they are connected to one another. According to the invention, when a third node DN3 is then connected to the first node DN1, not only the nodes DN3 and DN1 exchange information included in their respective routing tables RT3 and RT1, but the first node DN1 transmits to the second node DN2 information obtained from the node DN3.

Thus, the information included in the routing tables of the Diameter nodes is propagated from one node to the other, limiting the probability of having to use a DNS request when a node of a particular domain has to reach a node of another domain.

FIG. 2 shows an exemplary implementation of the method for transmitting routing information, according to a first and a second embodiment of the invention.

The phases P1 and P2 illustrate an example of the first embodiment, in which it is assumed that the routing table of the node DN1 includes information relating to a node DN3, that the routing table of the node DN2 includes information relating to a node DN4, and that the nodes DN1 and DN2 are not initially connected to one another.

In a known phase, P1, of connection, comprising the steps E1, E2, F1 and F2, the node DN1 connects to the node DN2. The address of the node DN2 has been previously obtained by the node DN1 in a known manner, either by manual configuration of the routing table of DN1, or by a DNS request. As is known, the connection procedure according to Diameter comprises an exchange of the management capabilities by messages called CER1, for "Capacity Exchange Request" and CEA1 for "Capacity Exchange Answer".

In the step E1, the node DN1 sends to the node DN2 the message CER1. The message CER1 received by the node DN2 in the step F1, comprises both an information item relating to the management capabilities of the node DN1, and a request for the corresponding information from the recipient node. In the step F2, the node DN2 sends, in response, to the node DN1, the message CEA1. The message CEA1, received by the node DN1 in the step E2, comprises an information item concerning the management capabilities of the node DN2.

In an intermediate step E2d between the phases P1 and P2, the node DN1 determines that the management capabilities in common between the nodes DN1 and DN2 comprise a routing information discovery capability.

In a route discovery phase P2, comprising the steps E3, E4, E4e, F3, F3e and F4, the information included in the routing tables of the nodes DN1 and DN2 is exchanged.

In the step E3 triggered by the setting up of the connection between the node DN1 and the node DN2, the node DN1 sends to the node DN2 a discovery request message called PDR1, for "Path Discovery Request". This message PDR1, on the one hand, comprises information from the routing table of the node DN1, for example information relating to at least one third node DN3, and, on the other hand, indicates to the node DN2 that the node DN1 is awaiting information from the routing table of the node DN2 in return.

The message PDR1 is received by the node DN2 in the step F3.

In a step F3e, the node DN2 enriches its routing table by storing therein information obtained in step F3, including, for example, information relating to the node DN3.

In step F4, the node DN2 sends to the node DN1 a discovery response message, called PDA1, for "Path Discovery Answer". This message PDA1 comprises information from the routing table of the node DN2, including, for example, information relating to at least one fourth node DN4.

The message PDA1 is received by the node DN1 in the step E4.

In a step E4e, the node DN1 enriches its routing table by storing therein information obtained in the step E4, including, for example, information relating to the node DN4.

Thus, by virtue of the method for transmitting routing information, the node DN1 will in the future know how to reach the node DN4 without using a DNS request.

Similarly, the node DN2 will in the future know how to reach the node DN3 without using a DNS request.

In a variant of this first embodiment, in the route discovery phase P2, it is the node DN2 which initiates a discovery request message PDR1b, and it is the node DN1 which responds with a discovery response message PDA1b. This message PDR1b, on the one hand, comprises information from the routing table of the node DN2, for example information relating to at least one fourth node DN4, and, on the other hand, indicates to the node DN1 that the node DN2 is awaiting information from the routing table of the node DN1 in return. The discovery response message PDA1 comprises information from the routing table of the node DN1, including, for example, information relating to at least one third node DN3.

It will be understood that, in this variant, the two steps of enrichment of the routing table remain the same but in another chronological order, and that the final result is the same, that is to say that the node DN1 will in the future know how to reach the node DN4 without using a DNS request, and that the node DN2 will in the future know how to reach the node DN3 without using a DNS request.

The phases P3 and P4 illustrate an example of the second embodiment, in which it is assumed that the nodes DN1 and DN2 are previously connected to one another, and that the routing table of the node DN1 does not initially include information relating either to a node DN3 or to a node DN5.

In a known connection phase, P3, comprising steps G1, G2, E5 and E6, the node DN3 connects to the node DN1. The address of the node DN1 has been previously obtained by the node DN3 in a known manner, either by manual configuration of the routing table of DN3, or by a DNS request. As is known, the connection procedure according to Diameter comprises an exchange of the management capabilities by messages called CER2 and CEA2. The steps G1, G2, E5 and E6 are similar respectively to the steps E1, E2, F1, and F2 of the phase P1, and do not have to be explained again.

In an intermediate step G2d between the phases P3 and P4, the node DN3 determines that the management capabilities in common between the nodes DN3 and DN1 comprise a routing information discovery capability.

In a route discovery phase P4, comprising the steps G3, G4, G4e, E7, E7e, E8, E9, F5 and F5e, information included in the routing tables of the nodes DN3 and DN1 and DN2 is exchanged.

In the step G3 triggered by the setting up of the connection between the node DN3 and the node DN1, the node DN3 sends to the node DN1 a discovery request message called PDR2. This message PDR2, on the one hand, comprises information from the routing table of the node DN3, for example information relating to at least one fifth node DN5, and, on the other hand, indicates to the node DN1 that the node DN3 is awaiting information from the routing table of the node DN1 in return.

The message PDR2 is received by the node DN1 in the step E7.

In a step E7e, the node DN1 enriches its routing table by storing therein information obtained in the step E7, including, for example, information relating to the node DN5.

In the step E8, the node DN1 sends to the node DN3 a discovery response message called PDA2. This message PDA2 comprises information from the routing table of the node DN1, including, for example, information relating to at least the second node DN2.

The message PDA2 is received by the node DN3 in the step G4.

In a step G4e, the node DN3 enriches its routing table by storing therein information obtained in the step G4, including, for example, information relating to the node DN2.

Thus, the node DN3 will in the future know how to reach the node DN2 without using a DNS request.

Similarly, the node DN1 will in the future know how to reach the node DN5 without using a DNS request.

In a step E9 triggered by the enrichment in the step E7e of the routing table of the node DN1, the node DN1 sends to the node DN2 a discovery request message called PDR3. This message PDR3, on the one hand, comprises information from the routing table of the node DN1, for example information relating to at least the third node DN3 and the fifth node DN5, and, on the other hand, indicates to the node DN2 that the node DN1 is not awaiting information from the routing table of the node DN2 in return, since it has already obtained it previously.

It should be noted that the node DN1 has previously determined, following its connection with the node DN2, that the management capabilities in common between the nodes DN1 and DN2 comprise a routing information discovery capability, and therefore that it can send to the node DN2 such a message PDR3.

The message PDR3 is received by the node DN2 in the step F5.

In a step F5e, the node DN2 enriches its routing table by storing therein information obtained in the step F5, including, for example, information relating to the node DN3 and to the node DN5.

Thus, by virtue of the method for transmitting routing information, the node DN2 will in the future know how to reach the node DN3 or the node DN5 without using a DNS request, and without there being any connection previously set up between the nodes DN2 and DN3. It is the enrichment of the routing table of the node DN1, previously connected to the node DN2, which triggers the steps leading to the enrichment of the routing table of the node DN2.

In a third embodiment of the invention, not illustrated, the discovery messages PDR or PDA between two nodes comprise only information relating to themselves or to nodes with which they are previously connected.

For example, in the route discovery phase P4, step E9, described in relation to FIG. 2, the message PDR3 comprises only information from the routing table of the node DN1 relating to nodes connected to DN1, that is to say the node DN3, but not information relating to nodes not connected to DN1, that is to say the node DN5.

This offers the advantage of limiting the volume of the information transmitted, and therefore the size of the messages PDR and PDA. In effect there may be a lot of these messages if the total number of Diameter nodes of the different domains is high, and it may be necessary to limit their size in order to avoid overloading the networks.

In relation to FIG. 3, an exemplary structure of a device for transmitting routing information is now presented, according to one aspect of the invention.

The device 100 for transmitting routing information implements the method for transmitting routing information, various embodiments of which have just been described.

Such a device 100 can be implemented in an equipment item dedicated to routing Diameter signaling, such as the "Diameter Edge Agent" defined by the 3GPP (3rd Generation Partnership Project) standard, or any dedicated Diameter agent such as the "Diameter Routing Function". The device 100 can also be implemented in network nodes of "Home Subscriber Server" (HSS) type, or of "Policy Control and Charging Rules Function" (PCRF) type, or in an AAA server.

For example, the device 100 comprises a processing unit 130, equipped for example with a microprocessor µP, and driven by a computer program 110, stored in a memory 120 and implementing the method for transmitting routing information according to the invention. On initialization, the code instructions of the computer program 110 are, for example, loaded into a RAM memory, before being executed by the processor of the processing unit 130.

Such a device 100 comprises:
a transmission module 140, capable of transmitting a signal ($S_{PDR}$) bearing a discovery request message or a signal ($S_{PDA}$) bearing a discovery response message, to another management equipment item equipped with a device 100,
a reception module 150, capable of receiving a signal ($S_{PDR}$) bearing a discovery request message or a signal ($S_{PDA}$) bearing a discovery response message, from another management equipment item equipped with a device 100.

Advantageously, the processing unit 130 can comprise:
an enrichment module 160, capable of enriching a routing table 170 by storing routing information received in a discovery request message or in a discovery response message.

The modules described in relation to FIG. 3 can be hardware or software modules.

The exemplary embodiments of the invention which have just been presented are only a few of the embodiments that can be envisaged. They show that the invention enables a network operator, by limiting, even by eliminating, the use of DNS requests, to exercise preferential choices concerning the routing of signaling messages relating to the management of subscribers to electronic communication services.

The invention claimed is:

1. A method for transmitting routing information between a first node and a second node of a plurality of nodes capable of exchanging data relating to management of subscribers to electronic communication services, the first node and the second node being connected and having exchanged their respective management capabilities using an authentication, authorization and accounting (AAA) protocol, the method comprising, when the management capabilities supported by both the first node and the second node comprise a routing information discovery capability:
triggered by a predetermined event, transmission by the first node, to the second node, of a routing information discovery message using the AAA protocol and comprising at least one routing information item included in a routing table of the first node and relating to at least one third node, wherein said transmission takes place after the exchange of respective management capabilities, wherein the at least one routing information item relating to the third node is stored in a routing table of the second node.

2. The method as claimed in claim 1, wherein the trigger event is a connection of the first node with the second node, the routing information discovery message is a routing information discovery request message, and the transmission is furthermore followed by:
reception by the first node, from the second node, of a discovery response message comprising at least one routing information item included in the routing table of the second node,
enrichment of the routing table of the first node by the storage of the at least one routing information item received.

3. The method as claimed in claim 1, wherein the routing information discovery message is a discovery response message and the trigger event is reception of a routing information discovery request message from the second node comprising at least one routing information item included in the routing table of the second node, and in that the method further comprises:

enrichment of the routing table of the first node by the storage of the at least one routing information item received.

4. The method as claimed in claim 1, wherein the trigger event is an enrichment of the routing table of the first node by at least one routing information item received from a fifth node.

5. The method as claimed in claim 1, wherein the routing information item relating to a node comprises:
   an identifier of the node,
   an identifier of the domain of the node.

6. The method as claimed in claim 5, wherein the routing information item relating to a node further comprises:
   a list of management capabilities supported by the node,
   a node type, for each management capability supported.

7. The method as claimed in claim 1, wherein the routing information discovery message comprises a field in XML format comprising the at least one routing information item.

8. The method as claimed in claim 1, wherein said at least one routing information item included in the routing information discovery message relates to at least one third node to which the first node is connected.

9. The method as claimed in claim 1, wherein the AAA protocol is the Diameter protocol.

10. The method as claimed in claim 1, wherein the AAA protocol is the RADIUS protocol.

11. A device for transmitting routing information between a first node and a second node of a plurality of nodes capable of exchanging data relating to management of subscribers to electronic communication services, the first node and the second node being connected and having exchanged their respective management capabilities using an authentication, authorization and accounting (AAA) protocol, wherein the device comprises:
   a module configured to transmit, by the first node, to the second node, a routing information discovery message using the AAA protocol and comprising at least one routing information item included in a routing table of the first node and relating to at least one third node, wherein said module is configured to transmit the routing information discovery message after the exchange of respective management capabilities, and
   a module configured to enrich the routing table by storing routing information received from the second node in another routing information discovery request message using the AAA protocol, or in a routing information discovery response message using the AAA protocol.

12. A non-transitory computer-readable storage medium that can be read by a management equipment item and comprising a computer program stored thereon, which comprises instructions that, when executed by a processor, implement a method for routing information between a first node and a second node of a plurality of nodes capable of exchanging data relating to management of subscribers to electronic communication services, the first node and the second node being connected and having exchanged their respective management capabilities using an authentication, authorization and accounting (AAA) protocol, the method comprising, when the management capabilities supported by both the first node and the second node comprise a routing information discovery capability:
   triggered by a predetermined event, transmission by the first node, to the second node, of a routing information discovery message using the AAA protocol and comprising at least one routing information item included in a routing table of the first node and relating to at least one third node, wherein said transmission takes place after the exchange of respective management capabilities, wherein the at least one routing information item relating to the third node is stored in a routing table of the second node.

* * * * *